United States Patent

[11] 3,622,529

[72] Inventor Milton L. Evans
Schenectady, N.Y.
[21] Appl. No. 807,417
[22] Filed Mar. 14, 1969
[45] Patented Nov. 23, 1971
[73] Assignee General Electric Company

[54] RTV SILICONE COMPOSITION CONTAINING AN IMIDATOSILANE
23 Claims, No Drawings
[52] U.S. Cl. ..................................................... 260/18 S,
117/124 F, 117/125 R, 117/135.1 R, 117/138.8 A,
117/148 R, 260/32.8 SB, 260/33.2 SB, 260/37 SB,
260/45.7 R, 260/45.75 R, 260/45.7 S, 260/46.5 E,
260/46.5 G, 260/33.6 SB, 260/33.8 SB
[51] Int. Cl. ......................................................... C08f 21/04
[50] Field of Search ............................................. 260/46.5 G,
46.5 E, 37 SB, 448.8, 448.2 N, 18 S

[56] References Cited
UNITED STATES PATENTS

| | | | |
|---|---|---|---|
| 3,127,363 | 3/1964 | Nitzsche et al. | 260/18 |
| 3,364,160 | 1/1968 | Golitz et al. | 260/18 |
| 3,378,520 | 4/1968 | Sattlegger et al. | 260/46.5 |
| 3,398,112 | 8/1968 | Johnson et al. | 260/37 |
| 3,471,434 | 10/1969 | Pande et al. | 260/37 |

Primary Examiner—Donald E. Czaja
Assistant Examiner—M. I. Marquis
Attorneys—Donavon L. Favre, Frank L. Neuhauser and Oscar B. Waddell ABSTRACT: Composition stable under substantially anhydrous conditions and curable to the solid, elastic state in the presence of moisture which comprises a silanol chain-stopped polydiorganosiloxane in which the organo groups are selected from the group consisting of hydrocarbyl, halohydrocarbyl and cyanoalkyl and an imidatosilane of the formula

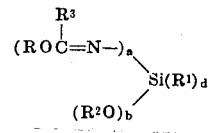

wherein $R^1$ is an organic radical of not more than 18 carbon atoms selected from the group consisting of hydrogen, hydrocarbyl, halohydrocarbyl and cyanoalkyl, R. and $R^2$ are each organic radicals of not more than 18 carbon atoms selected from the group consisting of hydrocarbyl, halohydrocarbyl, nitrohydrocarbyl and alkoxyhydrocarbyl, $R^3$ is an organic radical of not more than 18 carbon atoms selected from the group consisting of hydrogen, hydrocarbyl, halohydrocarbyl, nitrohydrocarbyl, alkoxyhydrocarbyl, dialkylamino and

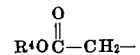

wherein $R^4$ is an organic radical selected from the group consisting of aliphatic hydrocarbyl, aliphatic halohydrocarbyl, aliphatic nitrohydrocarbyl, and

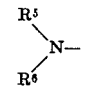

wherein $R^5$ and $R^6$ are each aliphatic hydrocarbyl, $a$ is an integer of 2 to 4, inclusive, $b$ is an integer of 0 to 2, inclusive, $d$ is an integer of 0 to 1, and the sum of $a$, $b$ and $d$ is 4.

RTV SILICONE COMPOSITION CONTAINING AN IMIDATOSILANE

This invention relates to one-package room temperature vulcanizing (RTV) compositions which are stable under substantially anhydrous conditions and which cure to the solid, elastic state upon exposure to atmospheric moisture.

The RTV compositions of this invention comprise an admixture of an imidatosilane of the formula

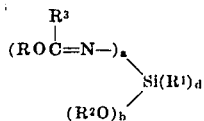

and a silanol chain-stopped polydiorganosiloxane in which the organo groups are selected from the group consisting of hydrocarbyl, halohydrocarbyl and cyanoalkyl, wherein $R^1$ is an organic radical of not more than 18 carbon atoms selected from the group consisting of hydrogen, hydrocarbyl, halohydrocarbyl and cyanoalkyl, R and $R^2$ are each organic radicals of not more than 18 carbon atoms selected from the group consisting of hydrocarbyl, halohydrocarbyl, nitrohydrocarbyl and alkoxyhydrocarbyl, $R^3$ is an organic radical of not more than 18 carbon atoms selected from the group consisting of hydrogen, hydrocarbyl, halohydrocarbyl, nitrohydrocarbyl, alkoxyhydrocarbyl, dialkylamino and

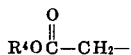

wherein $R^4$ is an organic radical selected from the group consisting of aliphatic hydrocarbyl, aliphatic halohydrocarbyl, aliphatic nitrohydrocarbyl, and

wherein $R^5$ and $R^6$ are each aliphatic hydrocarbyl, $a$ is an integer of 2 to 4, inclusive, $b$ is an integer of 0 to 2, inclusive, $d$ is an integer of 0 to 1, and the sum of $a$, $b$ and $d$ is 4.

The term hydrocarbyl as used herein means a hydrocarbon from which one hydrogen atom has been removed, i.e., a monovalent hydrocarbon.

The silanol chain-stopped polydiorganosiloxanes useful in the RTV compositions of this invention can be represented by the formula

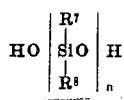

wherein $R^7$ and $R^8$ are each organic radicals of not more than 18 carbon atoms selected from the group consisting of hydrocarbyl, halohydrocarbyl and cyanoalkyl, and $n$ is an integer of at least 5 and is generally from about 10 to about 15,000 or more.

The silanol chain-stopped polydiorganosiloxanes are well known in the art and include compositions containing different $R^7$ and $R^8$ groups. For example, the $R^7$ groups can be methyl, while the $R^8$ groups can be phenyl and/or betacyanoethyl, Furthermore, within the scope of the polydiorganosiloxanes useful in this invention are copolymers of various types of diorganosiloxane units, such as silanol chain-stopped copolymers of dimethylsiloxane units, diphenylsiloxane units and methylphenylsiloxane units or, for example, copolymers of dimethylsiloxane units, methylphenylsiloxane units and methylvinylsiloxane units. Preferably, at least 50 percent of the $R^7$ and $R^8$ groups of the silanol chain-stopped polydiorganosiloxanes are methyl groups. A mixture of various silanol chain-stopped polydiorganosiloxanes also can be employed. The silanol chain-stopped materials useful in the RTV compositions of this invention have been described as polydiorganosiloxanes but such materials can also contain minor amounts, e.g., up to about 1.0 percent of monoorganosiloxane units such as monoalkylsiloxane units, e.g., monomethylsiloxane units and monophenylsiloxane units, and mono-t-alkoxysiloxane units, e.g., mono-t-butoxysiloxane units and mono-t-pentoxysiloxane units; and triorganosiloxane units, such as trialkylsiloxane units, e.g., trimethylsiloxane units, tributylsiloxane units and triphenylsiloxane units, and tri-t-alkoxysilane units, e.g., tri-t-butoxysiloxane units and tri-t-pentoxysiloxane units. Many of the tri-alkoxysilanes useful as part of the silanol chain-stopped materials are described and claimed in application Ser. No. 634,828 filed May 1, 1967, the disclosure of which is expressly incorporated herein by reference.

The silanol chain-stopped polydiorganosiloxanes employed in the practice of the present invention can vary from thin fluids to viscous gums, depending upon the value of $n$ and the nature of the particular organic groups represented by $R^7$ and $R^8$. Preferably, the silanol chain-stopped polydiorganosiloxane will have a viscosity in the range of about 100 centipoise to 50,000 centipoise at 25° C.

In the above formula, R and $R^2$ can be, for example, mononuclear and binuclear aryl, such as phenyl, naphthyl, benzyl, tolyl, xylyl, 2,6-di-t-butylphenyl, 4-butylphenyl, 2,4,6-trimethylphenyl, biphenyl and ethylphenyl; halogen-substituted mononuclear and binuclear aryl, such as 2,6-dichlorophenyl, 4-bromophenyl, 2,5-difluorophenyl, 4,4'-dichlorobiphenyl, 2'-chloronaphthyl, 2,4,6-trichlorophenyl and 2,5-dibromophenyl; nitro-substituted mononuclear and binuclear aryl, such as 4-nitrophenyl and 2,6-dinitrophenyl; alkoxy-substituted mono- and binuclear aryl, such as 4-methoxyphenyl, 2,6-dimethoxyphenyl, 4-t-butoxyphenyl, 2-ethoxyphenyl, 2-ethoxynaphthyl and 2,4,6-trimethoxyphenyl; alkyl such as methyl, ethyl, n-propyl, isopropyl, n-butyl, sec-butyl, isobutyl, tert-butyl, amyl, hexyl, heptyl, octyl, nonyl, decyl, dodecyl and the various homologs and isomers of alkyl of not more than 18 carbon atoms; alkenyl such as vinyl, allyl, n-butenyl-1, n-butenyl-2, n-pentenyl-2, n-hexenyl-2, 2,3-dimethylbutenyl-2, n-heptenyl, n-decenyl, n-dodecenyl and the various homologs and isomers of alkenyl of not more than 18 carbon atoms; alkynyl such as propargyl, 2-butynyl and the various homologs and isomers of alkynyl of not more than 18 carbons atoms; haloalkyl such as chloromethyl, iodomethyl, bromomethyl, fluoromethyl, chloroethyl, iodoethyl, bromoethyl, fluoroethyl, trichloromethyl, diiodoethyl, tribromomethyl, trifluoromethyl, dichloroethyl, chloro-n-propyl, bromo-n-propyl, iodoisopropyl, bromo-n-butyl, bromo-tert-butyl, 1,3,3-trichlorobutyl, 1,3,3-tribromobutyl, chloropentyl, bromopentyl, 2,3-dichloropentyl, 3,3-dibromopentyl, chlorohexyl, bromohexyl, 2,4-dichlorohexyl, 1,3-dibromohexyl, 1,3,4-trichlorohexyl, chloroheptyl, bromoheptyl, fluoroheptyl, 1.3-dichloroheptyl, 1,4,4-trichloroheptyl, 2,4-dichloromethylheptyl, chlorooctyl, bromooctyl, iodooctyl, 2,4-dichloromethylhexyl, 2,4-dichlorooctyl, 2,4,4-trichloromethylpentyl, 1,3,5-tribromooctyl and the various homologs and isomers of haloalkyl of not more than 18 carbon atoms; haloalkenyl such as chlorovinyl, bromovinyl, chloroallyl, bromoallyl, 3-chloro-n-butenyl-1, 3-chloro-n-pentenyl-1, 3-fluoro-n-heptenyl-1, 1,3,3-trichloro-n-heptenyl-5, 1,3,5-trichloro-n-octenyl-6, 2,3,3-trichloromethylpentenyl-4 and the various homologs and isomers of haloalkenyl of not more than 18 carbon atoms; haloalkynyl such as chloropropargyl, bromopropargyl and the various homologs and isomers of haloalkynyl of not more than 18 carbon atoms; nitroalkyl such as nitromethyl, nitroethyl, nitro-n-propyl, nitro-n-butyl, nitropentyl, 1,3-denitroheptyl and the homologs and isomers of nitroalkyl of not more than 18 carbon atoms; nitroalkenyl such as nitroallyl, 3-nitro-n-butenyl-1, 3-nitro-n-heptenyl-1 and the various homologs and isomers of nitroalkenyl of not more than 18 carbon atoms; nitroalkynyl such as nitropropargyl and the various homologs and isomers of nitroalkynyl of not more than 18 carbon atoms; alkoxyalkyl and polyalkoxyalkyl such as methoxymethyl, ethoxymethyl, butoxymethyl, methoxyethyl, ethoxyethyl, ethoxyethoxyethyl, methoxyethoxymethyl, butoxymethoxyethyl, ethoxybutoxyethyl, methoxypropyl, butoxypropyl, methoxybutyl, butoxybutyl, methoxypentyl, butoxypentyl, methoxymethoxypentyl, butoxyhexyl, methoxyheptyl, ethoxyethoxy and the various homologs and isomers of alkoxyalkyl and polyalkoxyalkyl of not more than 18 carbon atoms; alkoxyalkenyl and polyalkoxyalkenyl such as ethoxyvinyl, methoxyallyl, butoxyallyl, methoxy-n-butenyl-1, butoxy-n-pentenyl-1, methoxyethoxy-n-heptenyl-1 and the various homologs and isomers of alkoxyalkenyl and polyalkoxyalkenyl of not more than 18 carbon atoms; alkoxyalkynyl and polyalkoxyalkynyl such as methoxypropargyl and the various homologs and isomers of alkoxyalkynyl and polyalkoxyalkynyl of not more than 18 carbon atoms; cycloalkyl, cycloalkenyl and alkyl, halogen, alkoxy and nitro-substituted cycloalkyl and cycloalkenyl such as cyclopentyl, cyclohexyl, cycloheptyl, cyclooctyl, cyclononyl, 6-methylcyclohexyl, 2,5-dimethylcycloheptyl, 4-butylcyclopentyl, 3,4-dichlorocyclohexyl, 2,6-dibromocycloheptyl, 6-methoxycyclooctyl, 2-nitrocyclopentyl, 1-cyclopentenyl, 3-methyl-1-cyclopentenyl, 5-methoxy-1-cyclopentenyl, 3,4-dimethyl-1-cyclopentenyl, 2,5-dimethoxy-1-cyclopentenyl, 5-methyl-5-cyclopentenyl, 3,4-dichloro-5-cyclopentenyl, 5-(tert-butyl)-1-cyclopentenyl, 2-nitro-1-cyclohexehyl, 1-cyclohexenyl, 3-methyl-1-cyclohexenyl, 3,4-dimethyl-1-cyclohexenyl, 6-methoxy-1-cyclohexenyl and the like.

In the above formula, the hydrocarbyl and substituted hydrocarbyl of $R^3$, $R^4$, $R^5$ and $R^6$ can be those listed above for R and $R^2$.

In the above formula, $R^1$ can be hydrogen, hydrocarbyl and halohydrocarbyl such as those listed above for R and $R^2$, and cyanoalkyl such as cyanomethyl, cyanoethyl, cyanobutyl, cyanoisobutyl and the various isomers and homologs of cyanoalkyl of not more than 18 carbon atoms. In the above formula, $R^7$ can be the groups listed above for $R^1$ with the exception of hydrogen and alkoxy.

In the above formula, preferably, $R^1$ is hydrogen, phenyl or alkyl of not more than 4 carbon atoms, R and $R^2$ are phenyl or alkyl or alkoxyalkyl of not more than 8 carbon atoms, $R^3$ is phenyl or alkyl of not more than 4 carbon atoms, at least 50 percent of the groups represented by $R^7$ are methyl, the remainder being methyl or phenyl and n is an integer from 10 to 15,000.

The RTV compositions of this invention exhibit improved properties in the cured state as compared to many known RTV compositions, particularly in the areas of noncorrosion, thick section cure and adhesion to substrates. Improved adhesion to substrates such as concrete, glass, wood and aluminum is obtained with the present RTV compositions in the cured state as compared to certain known compositions. Most importantly, the improved adhesion is obtained without the use of expensive and time-consuming primers. The present RTV compositions can be used under environmental conditions where the use of certain known RTV compositions is not without possible harmful effects from corrosion. Finally, many of the RTV compositions of this invention give a more satisfactory thick section cure than is possible with many known RTV compositions.

The RTV compositions of the present invention are prepared by simply admixing one or more of the imidatosilanes with the silanol chain-stopped polydiorganosiloxane. Since the imidatosilanes tend to hydrolyze upon contact with moisture, care should be exercised to exclude moisture during the addition of the imidatosilane to the silanol chain-stopped polydiorganosiloxane. Likewise, care should be taken that the mixture of the imidatosilane and the silanol chain-stopped polydiorganosiloxane is maintained under substantially anhydrous conditions if it is desired to store the admixture for an extended period of time prior to conversion of the composition to the cured, solid, elastic silicone rubber state. On the other hand, if it is desired to permit the mixture to cure immediately upon admixture of the imidatosilane and the polydiorganosiloxane, no special precautions are necessary and the two components can be mixed and placed in the form or shape in which it is desired for the composition to be cured.

The amount of the imidatosilane admixed with the silanol chain-stopped polydiorganosiloxane can vary within wide limits. However, for best results, it is preferred to add in excess of one mole of the imidatosilane per mole of silicon-bonded hydroxyl groups in the silanol chain-stopped polydiorganosiloxanes. Satisfactory curing can be obtained, for example, with from 1.0 to 4 moles of the imidatosilane per mole of silicon-bonded hydroxyl groups in the polydiorganosiloxane. No particular benefit is derived from using more than 4 moles of the imidatosilane per mole of the polydiorganosiloxane. The temperature at which the imidatosilane and the silanol chain-stopped polydiorganosiloxane are admixed is not critical and a temperature from about 20° to about 80° C. is usually employed.

The admixture can be carried out in the presence of an inert solvent (that is a solvent which will not react with the alkoxy or imidato groups on the silicon). Suitable solvents include hydrocarbons such as benzene, toluene, xylene or petroleum ethers; halogenated solvents such as perchloroethylene or chlorobenzene and organic ethers such as diethylether and dibutylether; ketones such as methylisobutylketone and fluid hydroxyl-free siloxanes. The presence of a solvent is particularly advantageous when the silanol chain-stopped polydiorganosiloxane is a high molecular weight gum. The solvent reduces the overall viscosity of the composition and facilitates cure. The RTV compositions may be kept in the solvent until they are to be used. This is particularly valuable when a gummy composition is to be employed in coating applications.

The RTV compositions of this invention are stable in the absence of moisture. Consequently, they can be stored for prolonged periods of time without deleterious effect. During this period of storage no significant change occurs in the physical properties of the RTV compositions. This is of particular importance from a commercial standpoint, since it assures that one an RTV composition is prepared with a certain consistency and cure time that neither will change significantly upon storage. Storage stability is one of the characteristics which makes the compositions of this invention particularly valuable as one-component room temperature vulcanizing compositions.

A wide choice of components is available in the preparation of the RTV compositions of the present invention. In general, the particular components employed are a function of the properties desired in the cured silicone rubber. Thus, with a particular imidatosilane, some variation in the properties of the cured silicone rubber are obtained by varying the molecular weight (as measured by viscosity) of the silanol chain-stopped polydiorganosiloxane. For a given system, as the viscosity of the silanol chain-stopped starting material increases, the tensile strength and hardness of the cured rubber decreases while the elongation increases. On the other hand, with a lower viscosity material, the cure is tighter so that the cured rubber has a lower elongation but a higher tensile strength and increased hardness.

RTV compositions prepared by mixing the imidatosilane with the silanol chain-stopped polydiorganosiloxanes can be used without further modification in many sealing, caulking or coating applications by merely placing the compositions in the desired place and permitting them to cure upon exposure to the moisture present in the atmosphere. Upon exposure of such compositions to atmospheric moisture, even after storage for times as long as 2 years or more, a "skin" will form on the compositions shortly after exposure and cure to the rubbery state will occur within 12 to 24 hours, all at room temperature. The time required for the formation of such skin can vary from a minimum of about 5 to 10 minutes to a maximum of about 1 to 2 hours.

It is often desirable to modify the RTV compositions of the present invention by the addition of various materials which act as extenders or which change various properties such as cure rate and color. For example, if it is desired to reduce the time required for complete cure by a factor of about 2 to 5 without affecting the work life of the RTV composition, the composition can be modified by the incorporation of a minor amount of carboxylic acid salt and/or chelates of a metal ranging from lead to manganese, inclusive, in the electromotive series of metals. The particular metals included are lead, tin, nickel, cobalt, iron, cadmium, chromium, zinc and manganese. The specific metal ion preferred is tin. The carboxylic acids from which the salts of these metals are derived can be monocarboxylic acids or dicarboxylic acids and the metallic salts can be either soluble or insoluble in the silanol chain-stopped polydiorganosiloxane. Preferably, the salts employed are soluble in the silanol chain-stopped polydiorganosiloxane since this facilitates the uniform dispersion of the salt in the reaction mixture.

Illustrative of metal salts which can be employed are, for example, zinc naphthenate, lead naphthenate, cobalt, naphthenate, iron, 2-ethylhexoate, cobalt octoate, zinc octoate, lead octoate, chromium octoate and tin octoate. Operative metal salts include those in which the metallic ion contains a hydrocarbon substituent, such as, for example, carbomethoxyphenyl tin trisuberate, isobutyl tin triceroate, cyclohexenyl lead triacotinate, xenyl lead trisalicylate, dimethyl tin dibutyrates, dibutyl tin diacetate, dibutyl tin dilaurate, divinyl tin diacetate, dibutyl tin dibenzoate, dibutyl tin dioctoate, dibutyl tin maleate, dibutyl tin adipate, diisoamyl tin-bis-trichlorobenzoate, diphenyl lead diformate, dibutyl tin dilactate, dicyclopentyl lead-bis-monochloroacetate, dibenzyl lead di-2-pentanoate, diallyl lead di-2-hexenoate, triethyl tin tartrate, tributyl tin acetate, triphenyl tin acetate, tricyclohexyl tin acrylate, tritolyl tin terephthalate, tri-n-propyl lead acetate, tristearyl lead succinate, trinaphthyl lead p-methylbenzoate, tris-phenyl lead cyclohexenyl acetate, triphenyl lead ethylmalonate, etc.

The amount of the metal salt of the organic carboxylic acid which can be employed is a function of the increased rate of curing desired so that any amount of such salt up to the maximum effective amount for increasing the cure rate can be employed. In general, no particular benefit is derived from employing more than about 5 percent by weight of such metal salt based on the weight of the silanol chain-stopped polydiorganosiloxane. Preferably, where such metal salt is employed, it is present in an amount equal to from about 0.01 to 2.0 percent by weight, based on the weight of the polydiorganosiloxane.

Metal chelates such as those disclosed in the U.S. Pat. Nos. 3,334,067 and 3,065,194 can be used in the RTV compositions of this invention as catalysts in amounts from about 0.01 part to about 10 parts based on 100 parts of the silanol chain-stopped polydiorganosiloxane.

Illustrative of metal chelates which can be employed are, for example, aluminum acetyl acetonate, chromium acetyl acetonate, and beta-dicarbonyltitanium compounds of the formula

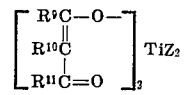

in which $R^9$ is a monovalent hydrocarbon radical having from one to 18 inclusive carbon atoms, $R^{10}$ is a monovalent radical selected from the group consisting of hydrocarbon radicals having from one to 18 carbon atoms and hydrogen atoms, $R^{11}$ is a monovalent radical selected from the group consisting of hydrocarbon radicals and aliphatic hydrocarbonoxy radicals each having from one to 18 inclusive carbon atoms, and Z is a radical selected from the group consisting of monovalent aliphatic hydrocarbonoxy radicals and monovalent acyloxy radicals, each having from one to 18 inclusive carbon atoms, hydroxyl radicals and divalent oxygen atoms forming a TiOTi linkage.

The RTV compositions of the present invention can also be varied by the incorporation of various extenders or fillers. Illustrative of the many fillers which can be employed with the compositions of the present invention are titanium dioxide, lithopone, zinc oxide, zirconium silicate, silica aerogel, iron oxide, diatomaceous earth, calcium carbonate, fumed silica, silazane treated silica, precipitated silica, glass fibers, magnesium oxide, chromic oxide, zirconium oxide, aluminum oxide, crushed quartz, calcined clay, asbestos, carbon graphite, cork, cotton, synthetic fibers, etc. Silazane treated silica fillers such as those disclosed and claimed in application Ser. No. 789,352 filed Jan. 6, 1969 are particularly suitable for use in the RTV compositions of this invention. When fillers are added to the compositions of the present invention, they are generally employed in amounts from about 20 to about 200 parts filler per 100 parts of silanol chain-stopped polydiorganosiloxane.

In addition to the modification of the RTV compositions of the present invention by the addition of metals salt, cure accelerators and fillers, these compositions can also be modified by the incorporation of various flame retardants, stabilizing agents and plasticizers such as siloxane fluids. Suitable flame retardants include antimony oxide, various polychlorinated hydrocarbons and organic sulfonates.

Where the compositions of the present invention contain components other than the imidatosilane and the polydiorganosiloxane, the various ingredients can be added in any desired order. However, for ease of manufacturing, it is often convenient to form a blend or mixture of all of the components of the room temperature vulcanizing organopolysiloxane except the imidatosilane, to then remove moisture from the resulting mixture by maintaining the mixture under vacuum and thereafter to add the imidatosilane prior to packaging of the composition in containers protected from moisture. Of course, where it is desired to permit the RTV composition to cure immediately upon formation, no special precautions need to taken during the addition of the imidatosilane and the mixture is allowed to cure in the desired shape.

The RTV compositions of the present invention are particularly adapted for caulking and sealing applications where adhesion to various surfaces is important. For example, these materials are useful in household caulking applications and industrial applications such as on buildings, factories, automotive equipment and in applications where adhesion to masonry, glass, plastic, metal and wood is required.

The following examples will illustrate the invention. Parts and percent are by weight unless otherwise indicated.

The polydimethylsiloxane used in examples 1 and 2 below comprises 55 weight percent of a, polydimethylsiloxane having a viscosity of about 3,100 centipoises at 25° C. and 45 weight percent of a polydimethylsiloxane having a viscosity of about 30,000 centipoises at 25° C.

EXAMPLE 1

An RTV composition is prepared by adding 5 parts of methyl-tris-(ethylacetimidato)silane and 0.2 part of dibutyl tin dilaurate to 100 parts of a silanol chain-stopped polydimethylsiloxane, 37.5 parts of a silazane-treated silica filler and 15 parts of a plasticizer with mixing under substantially anhydrous conditions. A portion of this mixture is exposed to the atmosphere at a temperature of about 27° C. and a relative humidity of 50 percent. In less than 10 minutes the composition begins to cure. At the end of about 30 minutes the composition is completely tack-free. Physical properties of the composition measured at the end of 5 days are a Shore A hardness of 30, a tensile strength (p.s.i.) of 325 and an elongation of 400 percent. Another portion of the mixture is coated on an unprimed aluminum surface at a thickness of about 40 mils. After curing, the coating exhibits a peel strength of 40 pi.

EXAMPLE 2

An RTV composition is prepared by adding 5 parts of methyl(ethoxy)-bis-(ethylacetimidato)silane and 0.2 part of dibutyl tin dilaurate to 100 parts of a silanol chain-stopped polydimethylsiloxane, 37.5 parts of a silazane-treated silica filler and 15 parts of a plasticizer with stirring under substantially anhydrous conditions. A portion of this reaction mixture is exposed to the atmosphere at a temperature of about 25 ° C. and a relative humidity of 50 percent. Physical properties of the composition measured at the end of 5 days are a Shore A hardness of 32, a tensile strength (p.s.i.) of 390 and an elongation of 500 percent. Another portion of the reaction mixture is coated on an unprimed aluminum surface at a thickness of about 40 mils. After curing, the coating exhibits a peel strength of 50 pi.

EXAMPLE 3

An RTV composition is prepared by adding 5 parts of methyl-tris-(isopropylpropionimidato)silane and 0.2 part of dibutyl tin dilaurate to 100 parts of a silanol chain-stopped polydimethylsiloxane having a viscosity of about 3,100 centipoise at 25° C., 50 parts of a silazane-treated silica filler and 5 parts of 5A. molecular sieves with stirring under substantially anhydrous conditions. A portion of this mixture is exposed to the atmosphere at a temperature of about 25° C. and a relative humidity of 50 percent. Physical properties of the composition measured at the end of 5 days are a Shore A hardness of 39, a tensile strength (p.s.i.) of 290 and an elongation of 500 percent.

The silazane-treated silica filler used in examples 1, 2 and 3 above is prepared as follows:

A fume silica filler is contacted with ammonia for about 1 ½ hour at 25° C. with agitation. Hexamethyldisilazane is added to the treated filler in an amount of about 20 parts per 100 parts of treated filler and the mixture is heated at about 130° C. for about 2 hours. Water in an amount of about one part by weight is added to the mixture and heating is continued at 130° C. for an additional hour. The treated silica filler is then purged with $N_2$ at 130° C. until the $NH_3$ content was 50 p.p.m.

The plasticizer used in examples 1 and 2 above is prepared by cohydrolyzing a mixture of 2.9 moles trimethylchlorosilane, 77.2 moles dimethyldichlorosilane and 19.9 moles methyltrichlorosilane at a temperature of 25° C. to produce a resin consisting essentially of 20 mole percent

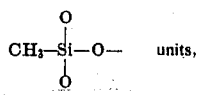 units, 5 mole percent

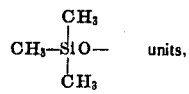 units, and 75 mole percent

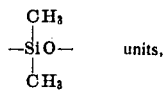 units, and containing 0.5 weight percent silanol groups.

The imidatosilanes useful in the RTV compositions of this invention are prepared by a process which comprises reacting an organic compound selected from the group consisting of (1) imidates and (2) a mixture of an imidate and an alcohol with a silane of the formula:

$$(R^1)_d SiX_f$$

in the presence of an acid acceptor. The process can be represented by the following representative synthesis:

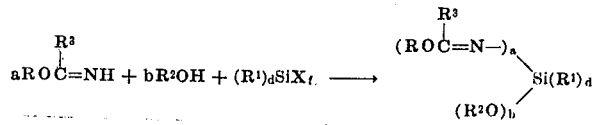

wherein R, $R^1$, $R^2$, $R^3$, $a$, $b$ and $d$ are defined above, $f$ is an integer of 3 to 4, and X is halogen (Cl, Br, F or I). In carrying out the process, the organic compound and the silane can be added separately or concomitantly to the reaction vessel in the required amounts or a molar excess of either reactant can be used. If excess reactant is employed, it is preferred that it be the organic compound since it will serves as a reaction medium and is easily separated from the product. Temperature of reaction is not critical and good results can generally be obtained at a temperature from about 0° to about 100° C. Temperatures from about 25° to about 80° C. are preferred.

The process is preferably carried out in the presence of an inert organic medium. The organic medium which can be employed in the process of this invention can be any of the well-known solvents and diluents which are inert to the reactants. For example, aromatic hydrocarbons such as benzene, toluene and xylene; ethers, such as diethyl ether, dibutyl ether, bis-(2-methoxyethyl) ether and tetrahydrofuran; cyclic hydrocarbons such as cyclohexane; nitriles such as acetonitrile and amides such as dimethylacetamide. Further details are set forth in application Ser. No. 807,436 filed of even date herewith in the name of the present inventor and assigned to the assignee of this invention.

Examples of imidatosilanes useful in the RTV composition of this invention include the following:
Methyl-tris(ethyldimethylcyanimidato)silane.
Methyl-tris(ethyldiethylcyanimidato)silane
Methyl-tris(ethyldiethylcyanimidato)silane.
Phenyl-tris(ethyldiethylcyanimidato)silane.
Phenyl-tris(ethyldimethylcyanimidato)silane.
Ethyl-tris(ethyldimethylcyanimidato)silane.
n-Propyl-tris(ethyldimethylcyanimidato)silane.
Methyl-tris(isopropylpropionimidato)silane.
Methyl-tris(ethylpropionimidato)silane.
Phenyl-tris(ethylpropionimidato)silane.
Phenyl-tris(n-butylpropionimidato)silane.
Phenyl-tris(chloromethylpropionimidato)silane.
Phenyl-tris(phenylpropionimidato)silane.
Phenyl-tris(2-chlorophenylpropionimidato)silane.
Methyl-tris(ethylacetimidato)silane.
tris(ethylacetimidato)silane.
Methyl-tris(n-butylacetimidato)silane.
Methoxy-tris(ethylacetimidato)silane.
Butoxy-tris(ethylacetimidato)silane.
Butoxy-tris(n-propylacetimidato)silane.
Phenyl-tris(ethylacetimidato)silane.
Phenyl-tris(chloromethylacetimidato)silane.
Phenyl(t-butoxy)-bis(ethylacetimidato)silane.
Ethyl(t-butoxy)-bis(ethylacetimidato)silane.
Phenyl(methoxy)-bis(ethylacetimidato)silane.
Phenyl(ethoxy)-bis(ethylacetimidato)silane.
t-Butyl(ethoxy)-bis(propylacetimidato)silane.
Methoxy(methoxy)-bis(butylacetimidato)silane.
Methyl(methoxy)-bis(ethylacetimidato)silane.
Methyl(dimethoxy)(ethylacetimidato)silane.
Methoxy(diethoxy)(ethylacetimidato)silane.
Methoxy(di-t-butoxy)(ethylacetimidato)silane.
Phenyl(di-t-butoxy)(ethylacetimidato)silane.
Phenyl(dimethoxy)(ethylacetimidato)silane.
Phenyl(dimethoxy)(ethylacetimidato)silane.
Methyl(dimethoxy)(butylpropionimidato)silane.
Methyl(di-phenoxy)(butylpropionimidato)silane.
Methoxy(t-butoxy)-bis(methylpropionimidato)silane.
Methyl(ethoxy)-bis(ethylpropionimidato)silane.
Methyl(methoxy)-bis(ethylpropionimidato)silane.
Methyl(n-butoxy)-bix(propylpropionimidato)silane.
Methyl(t-butoxy)-bis(methylpropionimidato)silane.
Methyl(t-butoxy)-bis(ethylacetimidato)silane.

What I claim as new and desire to secure by Letters Patent of the United States is:

1. Composition stable under substantially anhydrous conditions and curable to the solid, elastic state in the presence of moisture which comprises a silanol chain-stopped polydiorganosiloxane in which the organo groups are selected from the group consisting of hydrocarbyl, halohydrocarbyl and cyanoalkyl and an imidatosilane of the formula

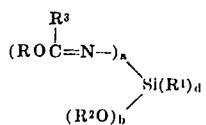

wherein $R^1$ is an organic radical of not more than 18 carbon atoms selected from the group consisting of hydrogen, hydrocarbyl, halohydrocarbyl and cyanoalkyl, R and $R^2$ are each organic radicals of not more than 18 carbon atoms selected from the group consisting of hydrocarbyl, halohydrocarbyl, nitrohydrocarbyl and alkoxyhydrocarbyl, $R^3$ is an organic radical of not more than 18 carbon atoms selected from the group consisting of hydrogen, hydrocarbyl, halohydrocarbyl, nitrohydrocarbyl, alkoxyhydrocarbyl, dialkylamino and

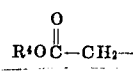

wherein $R^4$ is an organic radical selected from the group consisting of aliphatic hydrocarbyl, aliphatic halohydrocarbyl, aliphatic nitrohydrocarbyl, and

wherein $R^5$ and $R^6$ are each aliphatic hydrocarbyl, $a$ is an integer of 2 to 4, inclusive, $b$ is an integer of 0 to 2, inclusive, $d$ is an integer of 0 to 1, and the sum of $a$, $b$ and $d$ is 4.

2. Composition of claim 1 wherein the silanol chain-stopped polydiorganosiloxane is represented by the formula

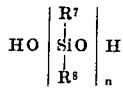

wherein $R^7$ and $R^8$ are each organic radicals of not more than 18 carbon atoms selected from the group consisting of hydrocarbyl, halohydrocarbyl and cyanoalkyl, and $n$ is an integer of at least 5 and is generally from about 10 to about 15,000.

3. Composition of claim 2 wherein at least 50 percent of the $R^7$ and $R^8$ groups are methyl.

4. Composition of claim 3 wherein the remaining $R^7$ and $R^8$ groups are phenyl.

5. Composition of claim 1 wherein R, $R^1$, $R^2$ and $R^3$ are alkyl.

6. Composition of claim 1 wherein R, $R^1$ and $R^3$ are alkyl and $b$ is zero.

7. Composition of claim 1 wherein R, $R^1$, $R^2$ and $R^3$ are alkyl and $b$ is 1.

8. Composition of claim 1 wherein R and $R^1$ are alkyl, $R^3$ is dialkylamino and $b$ is zero.

9. Composition of claim 1 wherein R and $R^2$ are alkyl, $R^3$ is dialkylamino and $b$ is 2.

10. Composition of claim 1 wherein R and $R^2$ are alkyl, $R^3$ is dimethylamino and $R^1$ is alkyl.

11. Composition of claim 1 wherein $R^1$ and $R^3$ are methyl and R and $R^2$ are ethyl.

12. Composition of claim 1 which also contains a filler.

13. Composition of claim 1 which also contains a filler and a catalyst selected from the class consisting of a metal salt of a carboxylic acid wherein the metal has worn which ranges from lead to manganese in the electromotive series of metals and a beta-dicarbonyl containing compound having the formula:

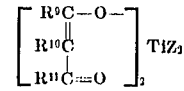

in which
$R^9$ is a monovalent hydrocarbon radical having from one to 18 inclusive carbon atoms,
$R^{10}$ is a monovalent radical selected from the group consisting of hydrocarbon radicals having from one to 18 carbon atoms and hydrogen atoms,
$R^{11}$ is a monovalent radical selected from the group consisting of hydrocarbon radicals and aliphatic hydrocarbonoxy radicals each having from one to 18 inclusive carbons atoms, and
Z is a radical selected from the group consisting of monovalent aliphatic hydrocarbonoxy radicals and monovalent acyloxy radicals, each having from one to 18 inclusive carbon atoms, hydroxyl radicals and divalent oxygen atoms forming a TiOTi linkage.

14. Composition of claim 2 which also contains a filler.

15. Composition of claim 1 wherein at least 50 percent of the organo groups of the silanol-stopped polydiorganosiloxane are methyl and R, $R^1$, $R^2$ and $R^3$ are alkyl.

16. Composition of claim 1 wherein at least 50 percent of the organo groups of the silanol-stopped polydiorganosiloxane are methyl, $R^1$ and $R^3$ are methyl and R and $R^2$ are ethyl.

17. Composition of claim 1 wherein the imidatosilane is methyl-tris(ethylacetimidato)silane.

18. Composition of claim 1 wherein the imidatosilane is methyl-tris(ethyldimethylcyanimidato)silane.

19. Composition of claim 1 wherein the imidatosilane is methyl-tris(isopropylpropionimidato)silane.

20. Composition of claim 1 wherein the imidatosilane is methyl(ethoxy)-bis(ethylacetimidato)silane.

21. Composition of claim 1 wherein the imidatosilane is methyl(isopropoxy)-bis(isopropylpropionimidato)silane.

22. Composition of claim 1 wherein the imidatosilane is methyl(diethoxy)ethylacetimidatosilane.

23. Composition of claim 1 wherein the imidatosilane is methyl(diisopropoxy)isopropylpropionimidatosilane.

* * * * *